(12) United States Patent
Lee et al.

(10) Patent No.: US 8,051,274 B2
(45) Date of Patent: Nov. 1, 2011

(54) PROCESSOR AND METHOD OF DECOMPRESSING INSTRUCTION BUNDLE

(75) Inventors: Sang-suk Lee, Busan-si (KR); Tai-song Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 12/467,536

(22) Filed: May 18, 2009

(65) Prior Publication Data

US 2010/0088536 A1     Apr. 8, 2010

(30) Foreign Application Priority Data

Oct. 7, 2008   (KR) .................. 10-2008-0098348

(51) Int. Cl.
  *G06F 9/30* (2006.01)
  *G06F 9/40* (2006.01)
  *G06F 15/00* (2006.01)

(52) U.S. Cl. ........................................ 712/208; 712/209
(58) Field of Classification Search .................... None
See application file for complete search history.

(56) References Cited

U.S. PATENT DOCUMENTS

| 5,819,058 A | * | 10/1998 | Miller et al. ............... 712/210 |
| 5,930,508 A | * | 7/1999 | Faraboschi et al. ......... 717/158 |
| 6,499,097 B2 | * | 12/2002 | Tremblay et al. .......... 712/204 |

FOREIGN PATENT DOCUMENTS

| EP | 0 953 898 | 11/1999 |
| JP | 2000-029731 | 1/2000 |
| JP | 2007-310905 | 11/2007 |
| KR | 10-2005-0037575 | 4/2005 |
| KR | 100592106 | 6/2006 |
| WO | WO 97/43710 | 11/1997 |

OTHER PUBLICATIONS

Wolf et al.; A Code Decompression Architecture for VLIW Processors; 2001; IEEE.*

* cited by examiner

*Primary Examiner* — Corey S Faherty
(74) *Attorney, Agent, or Firm* — NSIP Law

(57) ABSTRACT

The description relates to an instruction fetch technology of a processor that processes a plurality of instructions in parallel. The processor exploits the use of a compression code fetched during a previous clock cycle when fetching compressed instructions from a program memory and creating an instruction bundle consisting of a sequence of instructions to be processed in parallel. A compression buffer is interposed between the program memory and an instruction decompression unit, such that a compression code read in a previous clock cycle is ready at the beginning of a decompression cycle of the subsequent instruction bundle thereby avoiding a delay due to memory read latency.

2 Claims, 5 Drawing Sheets

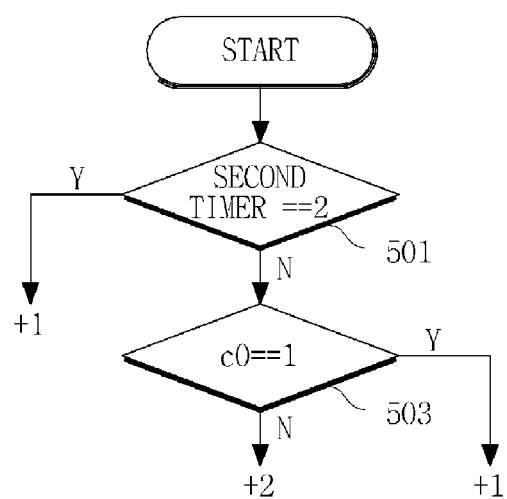

PROCESSOR AND METHOD OF DECOMPRESSING INSTRUCTION BUNDLE

CROSS REFERENCE TO RELATED APPLICATION(S)

This application claims the benefit under 35 U.S.C. §119 (a) of Korean Patent Application No. 10-2008-98348, filed on Oct. 7, 2008, the disclosure of which is incorporated herein in its entirety by reference.

BACKGROUND

1. Field

The following description relates to a processor that executes instructions stored in a program memory, and more particularly to a very long instruction word processor.

2. Description of the Related Art

A very long instruction word (VLIW) machine refers to a central processing unit (CPU) architecture for exploiting instruction level parallelism (ILP). In a superscaler architecture, a processor includes a number of multiprocessing blocks. Multiple instructions of a sequence of instructions to be executed are processed simultaneously by the multiprocessing blocks. In such a parallel architecture, hardware with a complex configuration is required to control scheduling of instruction execution.

In a VLIW approach, a compiler (i.e., software outside of the processor), schedules instruction execution. As a result, the instruction execution schedule in the processor is fixed. Therefore, the complex hardware for control may be simplified.

An instruction bundle of a VLIW machine includes instructions to be executed simultaneously by multiprocessing blocks inside. The number of instructions to be executed in parallel may be smaller than the width of a VLIW instruction by virtue of such factors as the restriction of ILP. In this case, "no operation" (NOP) instructions fill each empty instruction slot. For memory efficiency, the regions containing NOP instructions are compressed when an instruction bundle is stored. The compression is accomplished by storing a stop bit together with the instructions, where the stop bit indicates the presence of NOP. The stop bit is used to determine the instructions to be executed in the subsequent clock cycle and also is used for calculating the next program counter. However, since a stop bit is read from a memory, the stop bit only may be determined after a memory read latency has lapsed. During a single clock cycle, most of time is used to determine a value of the stop bit by the memory. Due to the time consumed by reading the stop bit, a clock cycle may be lengthened, or in some cases, it might be necessary to add an additional clock cycle for each instruction fetch cycle to avoid such lengthening. These changes in clock cycles act as bottlenecks that restrict the clock speed of a VLIW machine.

SUMMARY

In one general aspect, a method for parallel processing by a processor including decompressing a compressed instruction fetched from a program memory; and generating an instruction bundle including a sequence of decompressed instructions configured for processing in parallel by the processor.

Generating the instruction bundle may include generating an instruction bundle with at least one of compressed instructions fetched during a present cycle and at least one "no operation" (NOP) instruction.

In another general aspect, a method for generating an instruction bundle including a sequence of decompressed instructions configured for processing in parallel by a processor, the method including fetching a compressed instruction and a compression code during a clock cycle; and generating an instruction bundle from the compressed instruction using a compression code fetched before the clock cycle.

The method may further include fetching "m" instructions and compression codes corresponding to each respective fetched instruction; storing the m compression codes temporarily for processing during a subsequent clock cycle; and decompressing one or more instruction bundles from the m instructions using the compression codes temporarily stored during a previous clock cycle.

When one of the fetched instructions is a conditional branch instruction, an instruction bundle may configured to be executed when a first condition is satisfied is decompressed using a compression code corresponding to the conditional branch instruction and fetched along with the instruction, and an instruction bundle to be executed when a second condition is satisfied may be decompressed using a compression code included in the conditional branch instruction itself.

The method also may include performing a function; returning to a call routine; and decompressing an instruction bundle configured to be next executed by the use of a compression code stored upon calling the function.

In yet another general aspect, a processor configured to processes individual instructions included in an instruction bundle in parallel by using inner processing blocks, includes a compression buffer configured to buffer a compression code read from a program memory; and an instruction decompression unit configured to decompress compressed instructions currently being fetched from the program memory using a compression code previously stored in the compression buffer.

The instruction decompression unit may include a timer unit configured to determine an output value according to compression codes read out from the compression buffer, an access control unit configured to calculate and output address values of the program memory from which instructions are read and to calculate and output a value of the program counter according to values of compression codes read out from the compression buffer and an output from the timer unit, and an instruction decompression unit configured to generate and output an instruction bundle by decompressing compressed instructions at addresses specified by the address values output from the access control unit using an output of the timer unit and a compression code previously stored in the compression buffer.

The timer unit may include an initialization unit configured to establish an initial value by combining values of the compression codes read out from the compression buffer; a first timer configured to be initialized by an input of the initialization unit and having an inner clock configured to count down; and a second timer configured to receive a value of the first timer, synchronize the received value from the first timer with a clock, and store the synchronized value.

The access control unit may includes a program counter calculation unit configured to calculate the program counter value according to the output of the timer unit and the values of the compression codes read out from the compression buffer; and a memory address calculation unit configured to calculate a value of an address for memory access according to the output value of the timer unit and the values of the compression codes read out from the compression buffer.

The compression buffer may include a first compression buffer configured to store a compression code read out from a program memory; and a second compression buffer configured to extract and stores a compression code included in a conditional branch instruction.

The compression buffer may include a first compression buffer configured to store a compression code read out from the program memory; and a second compression buffer configured to store a compression code upon calling a function, the compression code corresponding to an instruction to be executed at the time of return of the function.

Other features and aspects will be apparent from the following detailed description, the drawings, and the claims.

BRIEF DESCRIPTION OF THE DRAWINGS

FIG. 4 shows output values of the first timer according to exemplary compression codes.

FIG. 5A shows a flowchart of an exemplary method of calculating a value of a program counter when the first timer is 1.

Figure 1:
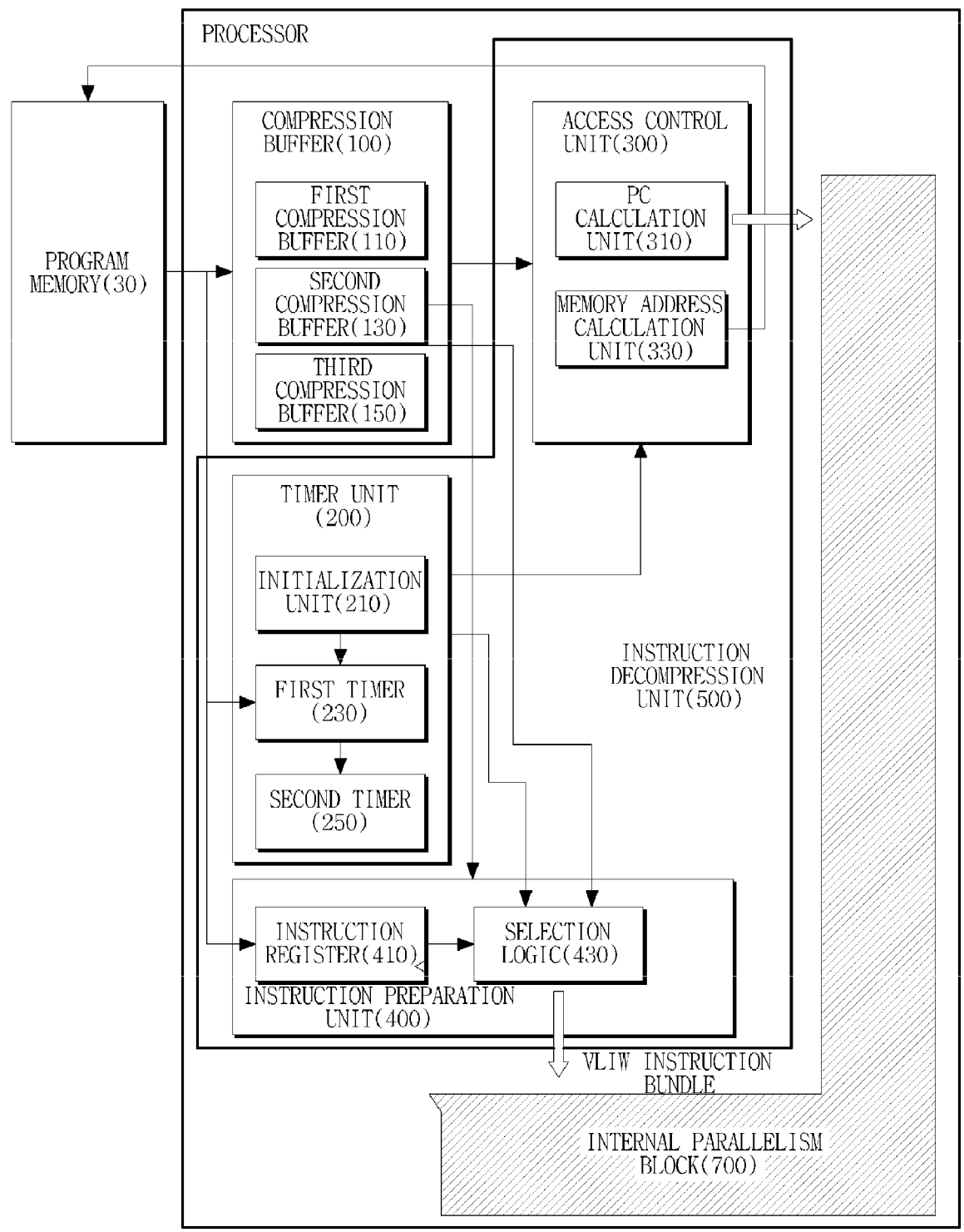
FIG. 1 is a block diagram of an exemplary processor and an exemplary program memory.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following disclosure describes creating an instruction bundle of compressed instructions to be processed in parallel by a processor to resolve a bottleneck phenomenon associated with to memory latency. The following detailed description is provided to assist the reader in gaining a comprehensive understanding of the methods, apparatuses, and/or systems described herein. Accordingly, various changes, modifications, and equivalents of the systems, apparatuses, and/or methods described herein will suggest themselves to those of ordinary skill in the art. Also, descriptions of well-known functions and constructions may be omitted for increased clarity and conciseness.

FIG. 1 shows a block diagram of a processor 10 and a program memory 30. As illustrated in FIG. 1, the processor 10 includes a compression buffer 100 and an instruction decompression unit 500. The compression buffer 100 buffers a compression code read from the program memory 30. The instruction decompression unit 500 decompresses and outputs compressed instructions currently fetched from the program memory 30 according to a compression code previously stored in the compression buffer 100. The program memory 30 may be outside the processor 10, such as, for example, a main memory unit or a cache outside the processor. The program memory 30 also may be in the processor 10, such as, for example, an instruction cache in the processor (not shown). The compression buffer 100 inside the processor 10 also may be provided to an instruction buffer, or the compression buffer 100 may be integrated with the instruction buffer. However, in the example shown in FIG. 1, since the compression information and instructions are not related each other, the compression buffer 100 is provided separately.

The compression code read out from the program memory 30 is buffered by the compression buffer 100 and is provided to the instruction decompression unit 500. The instruction decompression unit 500 uses a compression code stored in the compression buffer 100 from a previous clock cycle to decompress an instruction fetched from the program memory 30. The compression code of the program memory 30 does not include the compression information of an instruction currently being executed, rather it includes the compression information of an instruction to be executed at a later time.

Figure 2:
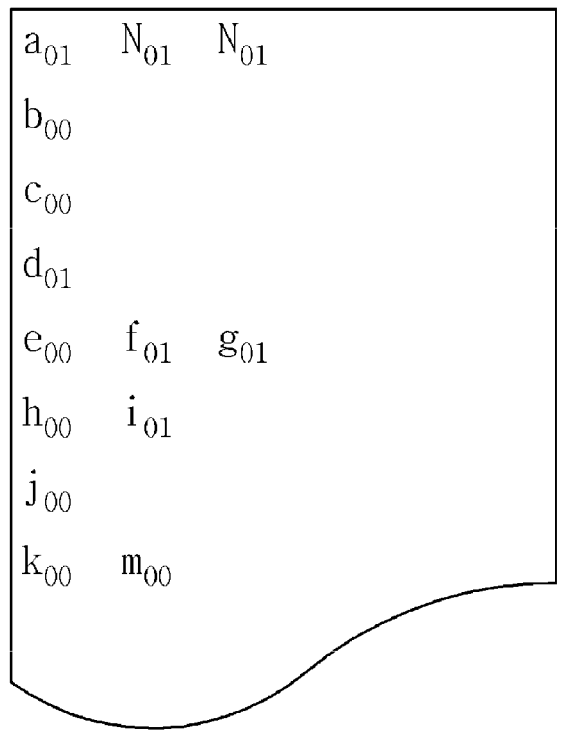
FIG. 2 illustrates an example of instructions and compression codes stored in a memory.

FIG. 2 shows examples of instructions and compression codes that may be stored in a memory. In FIG. 2, characters "a," "b," "c," and so on represent instructions, and subscripts represent compression codes to be stored corresponding to the instructions. Among the instructions, N denotes "no operation" (NOP). In this example, the number of instructions to be executed in parallel at a time is three, and an instruction bundle is composed of three instructions. Also, instructions are fetched from the memory three by three. Each of the compression codes represented by the subscripts indicates the compression information of an instruction to be fetched next, and not the compression information of a current instruction. In the example in FIG. 2, the first three instructions are not compressed. The compression code "01" indicates that following instructions are NOP instructions. The compression code "00" indicates that the subsequent instructions are meaningful instructions.

For example, since the first three compression codes in FIG. 2 have values of {01, 01, 01}, the next three instructions fetched from the memory, which are {b, c, d}, are decompressed with these compression codes. Since the compression code corresponding to the instruction 'b' has a value of "01," the instruction "b" becomes the last instruction, and thus an instruction bundle decompressed in the second clock cycle is {b, NOP, NOP}. Meanwhile, the compression codes to be read together with the instructions {b, c, d} are {00, 00, 01}. These compression codes are for instructions {e, f, g} fetched from the memory in the subsequent clock cycle. Since the compression code corresponding to the instruction "e" is "00," the instruction "e" is processed along with the next instruction "f" in parallel. Since the compression code for the instruction "f" is "00," the instruction "f" is processed together with the next instruction "g" in parallel. Also, since the compression code for the instruction "g" is "01," the instruction "g" becomes the last instruction. Therefore, the instruction bundle to be processed in parallel in the third cycle becomes {e, f, g}.

The compression buffer 100 includes a first compression buffer 110 for storing a compression code read out from the program memory 30. The first compression buffer 110 operates as a flip-flop and is synchronized with a system clock to latch compression code data to be read from the program memory 30. The latched compression code data is read out after being synchronized with a clock in the subsequent cycle. In FIG. 1, the rotated circumflex mark in the first compression buffer 110 indicates that the first compression buffer 110 includes a flip-flop that operates in synchronization with the clocks.

In another example, the compression buffer 100 may further include a second buffer 130 that extracts a compression code from a conditional branch instruction and stores the extracted compression code. For example, two instructions may be executed after a conditional branch instruction, such as "if-else": one is an instruction to be executed when the conditional expression is "true," and another is an instruction to be executed when the conditional expression is "false." The compression code according to the present example may contain information of only one of the two instructions. According to another aspect, the VLIW compiler places the other compression code for the other case in a reserved field of the instruction code of the conditional branch code. A control unit of the processor 10 extracts the compression code from a predetermined region of an instruction register 410, which is described in further detail below, and stores the extracted compression code in the second buffer 130. To this end, the processor 10 enables static branch prediction and supports restoration from incorrect predictions. Also, the conditional branch instruction should have an empty bit field of a size of: memory issue width×compression code.

The compression buffer 100 may further include a third compression buffer 150 that stores a compression code corresponding to an instruction to be executed when a called function returns to a call routine. Compression information of the first instruction to be executed in the call routine after the called function is complete is stored in the third buffer 150 in advance. Accordingly, an instruction bundle to be executed when the function returns to the call routine may be decompressed immediately. The compression information according to this example is described in greater detail below.

Referring to FIG. 1 again, the instruction decompression unit 500 includes a timer unit 200 that determines an output value according to values of the compression codes read out from the compression buffer 100, an access control unit 300 that calculates and outputs the address values and a program counter value to read instructions from the program memory 30 according to the values of the read compression codes and the outputs from the timer unit 200, and an instruction preparation unit 400 that generates and outputs an instruction bundle by decompressing compressed instructions of the designated addresses output from the access control unit 300 by the use of outputs from the timer unit 200 and the previous compression codes stored in the compression buffer 100.

The timer unit 200 includes an initialization unit 210, a first timer 230, and a second timer 250. The initialization unit 210 establishes an initial value by combining the values of compression codes read out from the compression buffer 100. The first timer 230 is initialized by an input of the initialization unit 210 and has an inner clock to count down.

Figure 3:
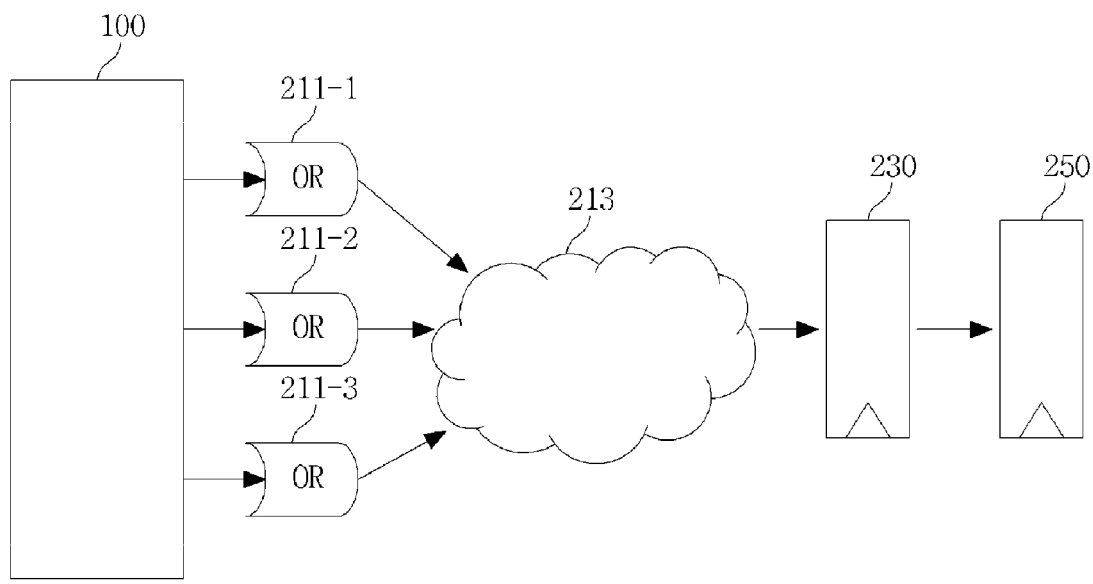
FIG. 3 is a schematic view of an exemplary configuration of the timer unit in FIG. 1.

FIG. 3 is a schematic view of the configuration of the timer unit 200 in FIG. 1. As shown in FIG. 3, the initialization unit 210 is formed of OR gates 211-1, 211-2, and 211-3 and a combinational logic circuit 213. Each of the OR gates 211-1, 211-2, and 211-3 detects whether a value of the compression code of the compression unit 100 is either "00" or "01," and the combinational logic circuit 213 combines values from the OR gates 211-1, 211-2, and 211-3 to generate an initialization value of the first timer 230. The output of the first timer 230 is latched to an input of the second timer 250. That is, the second timer 250 retains a value equal to the value of the first timer 230 in the previous clock. The first timer 230 counts down to 0 from the initialization value as the system clock progresses. The second timer 250 is a flop-flop having an output of the first timer 230 as an input.

FIG. 4 shows the relations between output values of the first timer 230 and the compression codes. As shown in FIG. 4, the values of the first timer 230 are determined according to values of the compression codes fetched from the memory. The value of the first timer 230 indicates the number of available compression codes stored in the compression buffer 100 used for decompressing instructions. Therefore, when the timer is 1, the number of the available compression codes obtainable from the compression buffer 100 for decompressing the instruction is one. Hence, the timer value decreases with the increase of a program counter. In addition, the timer value of 0 indicates that the compression buffer needs to be updated with new data in a subsequent cycle. As such, the value of the first timer 230 is down-counted as the cycle progresses, and the second timer 250 sequentially receives and stores the values of the first timer 230 in synchronization with the clocks.

According to another example, the access control unit 300 includes a program counter calculation unit 310 and a memory address calculation unit 330. The program counter calculation unit 310 calculates a program counter value according to outputs from the timer unit 200 and compression codes read out from the compression buffer 100. The memory address calculation unit 330 calculates an address value for memory access according to the outputs from the timer unit 200 and the compression codes read out from the compression buffer 100.

When a value of the first timer 230 is 2, it indicates that the value of each compression code is "01," and thus the program counter increases by 1. FIG. 5A is a flowchart of an exemplary method of calculating a value of the program counter when the first timer 230 is 1. As shown in FIG. 5A, when a value of the first timer 230 is 1 and a value of the second timer 250 is 2 (i.e., a value of the first timer in a previous clock cycle), the program counter increases by 1 (501). If the value of the first timer 230 is not 1, the program counter increases by either 1 or 2 according to a value of the first compression code c0 stored in the compression buffer (503). If the value of the first compression code c0 is "01," an instruction bundle to be output is inevitably in the form of {a, NOP, NOP}. Thus, only one instruction out of the instructions stored in the instruction register 410 is included in the instruction bundle, and consequently the program counter increases by 1. If the value of the compression code c0 is "00," the value of the timer is 1, and thus the values of the rest of the compression codes c1 and c2 all become "01." Thus, the instruction bundle to be output may be in the form of {a, b, NOP}. Accordingly, two instructions out of the instructions stored in the instruction register 410 are included in the instruction bundle, and hence the program counter increases by 2.

Figure 5B:
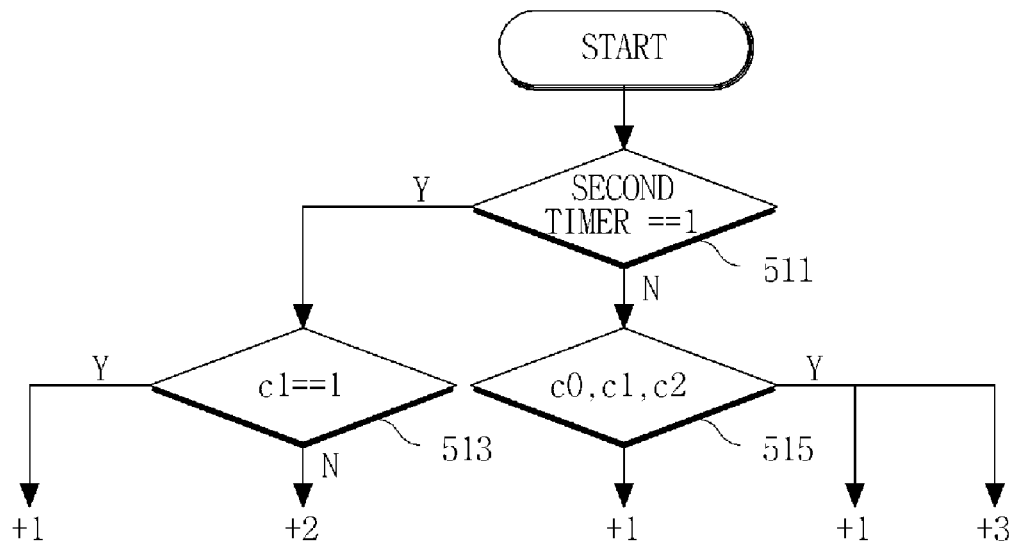
FIG. 5B is a flowchart of an exemplary method of calculating a value of a program counter when the first timer is 0.

FIG. 5B is a flowchart of a method of calculating a value of a program counter when the first timer 230 is 0. As shown in FIG. 5B, when the value of the first timer 230 is 0 and the value of the second timer 250 is 1 (i.e., the value of the first timer 230 in a previous clock cycle), (511), the program counter may increase by either one or two according to a value of the compression code c1, (i.e., the middle compression code among the compression codes stored in the compression buffer 100) (513). When the first timer 230 is 0 and the second timer 250 is 1, it indicates that one of compression codes (i.e., compression code c0) with a value of "01," which are originally included in the compression buffer 100, is used in a previous clock cycle and currently only one compression code with a value of "01" is available. That is, one of the compression codes c1 and c2 has a value of "00" and another has a value of "01." When the compression code c1 has a value of "01," an instruction bundle to be output may be in the form of {c, NOP. NOP}, and thus the program counter increases by 1. If a value of the compression code c1 is "00," c2 has a value of "01" and the instruction bundle is output in the form of {c, d, NOP}. Therefore, two of the instructions stored in the instruction register 410 are included in the instruction bundle, and the program counter increases by 2. If the second timer 250 is not 1, this indicates that the compression codes stored in the compression buffer 100 are newly read from a memory and only one of the stored compression codes has a value of "01" (511). Hence, only one compression code from among the compression codes c0, c1, and c2 has a value of "01." If c0 has a value of "01," the instruction bundle has the form of {c, NOP, NOP} and may be output, and the program counter increases by 1 (515). If c1 has a value of "01," the instruction bundle has the form of {c, d, NOP} and may be output, and the program counter increases by 2. If c2 has a value of "01," the instruction bundle has the form of {c, d, e} and may be output, and the program counter increases by 3.

Unlike conventional technology in which data is fetched from a memory by the program counter, the memory address value does not always coincide with the value of the program counter. Thus, according to the description herein, the memory address calculation unit 330 is provided in addition to the program counter calculation unit 310. The memory address calculation unit 330 calculates an address of the program memory 30, which is read into the processor 10. Unlike the program count by which the number of executed instructions is counted, the memory access according to the description herein is accomplished by three addresses since the memory is a time sensitive based memory. As such, a code to be decompressed is determined based on the compression information, which has been fetched in advance, and a fetching time point that is determined based on a value of the timer. As a result, redundant memory accesses may be avoided and unnecessary memory power consumption can be reduced.

Figure 6:
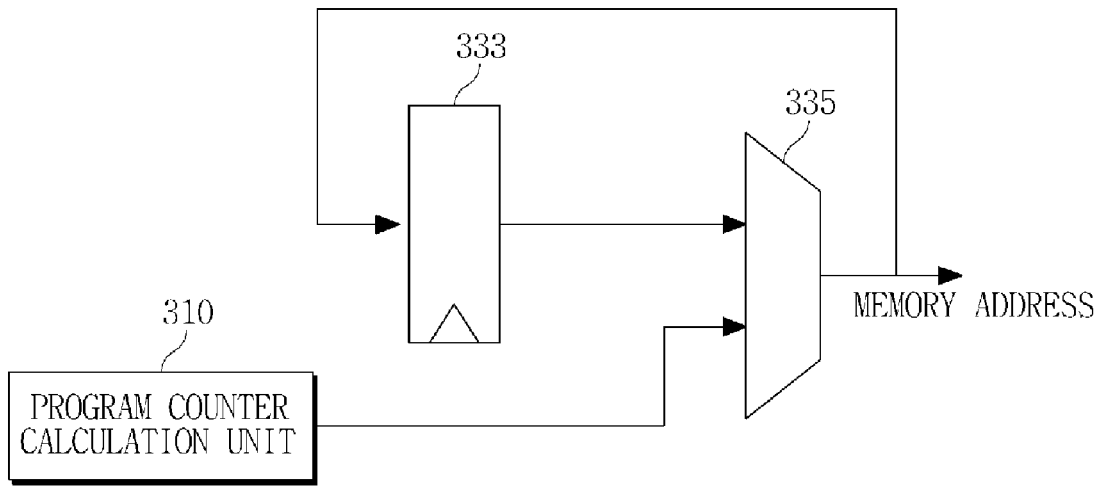
FIG. 6 is a block diagram illustrating an exemplary schematic configuration of the memory address calculation unit shown in FIG. 1.

FIG. 6 is a block diagram of schematic configuration of the memory address calculation unit 330 shown in FIG. 1. A selecting unit 335 selects between an output of an address counter register 333 and an updated value of the program counter, which is an output from the program counter calculation unit 310. The selecting unit 333 selects the updated value of the program counter, which is output from the program counter calculation unit 310 at the time when an output of the first timer 230 is changed from 1 to 0, and in the other cases, the selecting unit 335 selects an output from the address counter register 333 such that a previous address value may be retained. While a memory address value is constantly maintained, memory access is avoided thereby reducing the number of times the memory is accessed.

Figure 7:
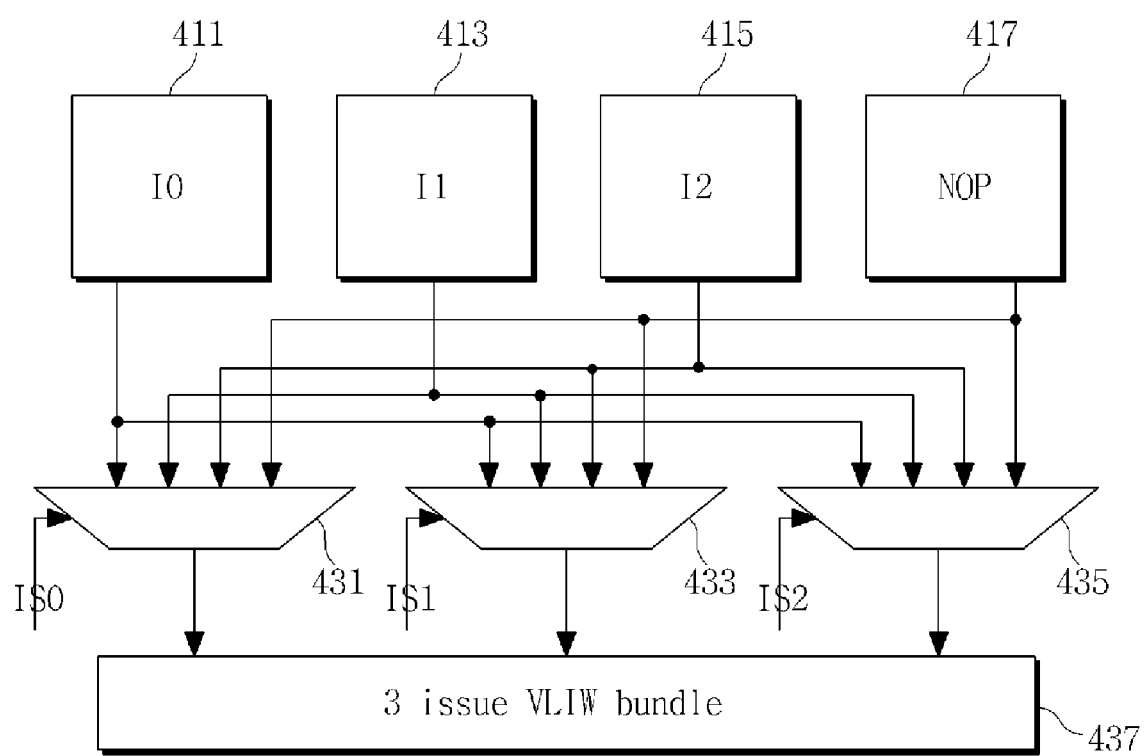
FIG. 7 is a block diagram of an exemplary schematic configuration of the instruction preparation unit in FIG. 1.

FIG. 7 is a block diagram of an exemplary schematic configuration of the instruction preparation unit 400 in FIG. 1. As shown in FIG. 7, the instruction preparation unit 400 decompresses an instruction using compression information stored during a previous clock cycle. In this example, the instruction preparation unit 400 includes the instruction register 410 and a selection logic unit 430. The instruction register 410 may include three registers 411, 413, and 415, each of which stores an instruction, and one register 417 which stores an NOP instruction. The selection logic unit 430 may include three 4-to-1 multiplexers 431, 433, and 435. Each multiplexer 431, 433, and 435 has an input data width which is the same as a bit width of each instruction. One of three instructions and the NOP instruction is selected and output by each multiplexer 431, 433, and 435.

An output instruction buffer 437 stores the output instructions as a single instruction bundle in the form of a three-issue VLIW instruction bundle and outputs the instruction bundle. The output instruction bundle is processed in parallel by an inner parallel processing block 700 of the processor 10 in FIG. 1. Table 1 shows instructions selected by the multiplexers 431, 433, and 435 according to a selection signal.

TABLE 1

| Selection signal | Selected instruction |
| --- | --- |
| 00 | I0 |
| 01 | I1 |
| 10 | I2 |
| 11 | NOP |

In FIG. 7, a signal IS0, IS1, IS2, or IS3 for selecting an output of the multiplexer 431, 433, or 435 is determined based on outputs of the compression buffer 100 and the timer values. A selection signal generating circuit may be a combinational logic circuit, which is not shown in FIG. 7. Table 2 shows combinations between outputs IS0, IS1, and IS2 of the select signals according to the timer value and the outputs c0, c1, and c2 of the compression buffer. A method of implementing the selection signal generating circuit, which is a combinational logic circuit, based on such table as Table 2 is well-known in this field of art.

TABLE 2

| First Timer | Second timer | C0 | C1 | C2 | IS0 | IS1 | IS2 |
| --- | --- | --- | --- | --- | --- | --- | --- |
| 2 | 0 | ? | ? | ? | 00 | 11 | 11 |
| 1 | 2 | ? | ? | ? | 01 | 11 | 11 |
| 1 | 0 | 1 | ? | ? | 00 | 11 | 11 |
| 1 | 0 | 0 | ? | ? | 00 | 01 | 11 |
| 0 | 1 | 1 | 1 | 0 | 01 | 11 | 11 |
| 0 | 1 | ? | 1 | 1 | 10 | 11 | 11 |
| 0 | 1 | 1 | 0 | 1 | 01 | 10 | 11 |
| 0 | 0 | 1 | 0 | 0 | 00 | 11 | 11 |
| 0 | 0 | 0 | 1 | 0 | 00 | 01 | 11 |
| 0 | 0 | 0 | 0 | 1 | 00 | 01 | 10 |

Hereinafter, operations of the compression buffer 100, the timer unit 200, the program counter calculation unit 310, the memory address calculation unit 330, and the instruction selection logic unit 430 are described with reference to FIG. 2. In FIG. 2, the contents of the instructions stored in the memory are represented by letters and corresponding compression codes are represented by subscripts. A letter "N" of the instruction indicates NOP.

According to this example, the instruction preparation unit 400 receives compression information and an instruction to decompress the instruction. The instruction is input to the instruction preparation unit 400 via a flip flop from an instruction memory. The compression information is an output from the compression buffer and is subsequently input to the instruction preparation unit 400 via a flip-flop. Thus, the instruction is input after a delay of one clock cycle in the instruction memory, and the compression information is input after a delay of two clock cycles.

At addresses of 0 to 2 of the instruction memory, instructions of {a, NOP, NOP} are stored. The instructions include {01, 01, 01} as their compression information. The compression buffer has values of {00, 00, 01}. The instruction buffer in the instruction preparation unit 400 contains NOP instructions, and the compression buffer in the instruction preparation unit 400 contains values of {00, 01, 10}. Accordingly, as shown in Table 4, provided below, output instructions are filled with NOPs that once filled an initial instruction buffer.

When a clock cycle begins, at addresses 3 to 5 of the instruction memory, instructions {b, c, d} are stored, and values {01, 01, 01} fill the compression buffer. When the compression buffer includes three '01's, the timer becomes 2. The instruction buffer in the instruction preparation unit 400 contains instructions of {a, N, N}, which have been fetched during a previous cycle. The compression buffer in the instruction preparation unit 400 contains compression codes of {00, 00, 01}, which have been fetched during a previous cycle. The selection signals are prepared as shown in Table 4, and hence instruction outputs become an instruction bundle of {a, N, N}. In this case, referring to Table 4, a next program counter is 4 and the memory address becomes 3.

In Table 3, the number in the center of each line of the memory address is an instruction, and the number in the right of the memory address column (i.e., the number in the "instructions to be output from memory" column) corresponds to a memory value to be output in a subsequent cycle when the address is input. For example, when the address is 12, an instruction output from the memory becomes {k, l, m}.

TABLE 3

| Next program counter (PC) | Memory address | Instructions to be output from memory | Compression buffer | First timer | Second timer |
|---|---|---|---|---|---|
| 3  | 0 0 3    | $a_{01} N_{01} N_{01}$ | 00 00 01 | 0 | 0 |
| 4  | 3 3 3    | $b_{00} c_{00} d_{01}$ | 01 01 01 | 2 | 0 |
| 5  | 3 3 3    | $b_{00} c_{00} d_{01}$ | 01 01 01 | 1 | 2 |
| 6  | 6 3 6    | $b_{00} c_{00} d_{01}$ | 01 01 01 | 0 | 1 |
| 9  | 9 6 9    | $e_{00} f_{01} g_{01}$ | 00 00 01 | 0 | 0 |
| 11 | 9 9 9    | $h_{00} i_{01} j_{00}$ | 00 01 01 | 1 | 0 |
| 12 | 12 9 12  | $h_{00} i_{01} j_{00}$ | 00 01 01 | 0 | 1 |
| 14 | 14 12 14 | $k_{00} l_{00} m_{00}$ | 00 01 00 | 0 | 0 |

TABLE 4

| Next PC | Compression buffer | IS0 | IS1 | IS2 | Decompression result |
|---|---|---|---|---|---|
| 3  | 00 00 00 | 00 | 01 | 10 | N N N |
| 4  | 01 01 01 | 00 | 01 | 10 | a N N |
| 5  | 01 01 01 | 00 | 11 | 11 | b N N |
| 6  | 01 01 01 | 01 | 11 | 11 | c N N |
| 9  | 00 00 01 | 10 | 11 | 11 | d N N |
| 11 | 00 01 01 | 00 | 01 | 10 | e f g |
| 12 | 00 01 01 | 00 | 01 | 11 | h i N |
| 14 | 00 01 00 | 00 | 00 | 00 | j N N |
| 14 | 00 01 00 | 00 | 00 | 00 | k m N |

In the next clock cycle, since the timer is not 0, there is no change in the instruction memory and the compression buffer, but the timer decreases by 1 to be "1." The instruction buffer in the instruction preparation unit 400 includes instructions {b, c, d}, which have been fetched during a previous clock cycle. The compression buffer in the instruction preparation unit 400 includes compression codes of {01, 01, 01}, which have been fetched during a previous clock cycle. Since a compression code corresponding to an instruction {b} is "01," the selection signals are prepared as shown in Table 4, and consequently an instruction to be output is an instruction bundle of {b, N, N}. The next program counter is 5, and the memory address is maintained as 3 as there is no new memory access.

When the next clock cycle begins, the instruction memory and the compression buffer do not change. Only the timer decreases by 1 to be "0." In addition, there is no change in the instruction buffer and the compression buffer in the instruction preparation unit 400. Since a compression code that corresponds to an instruction {c} is "01," the selection signals are prepared as shown in Table 4, and consequently an instruction to be output becomes an instruction bundle of {c, N, N}. A next program counter is 6, and a memory address is 6 as the new memory access is needed.

When the subsequent clock cycle begins, at addresses 6 to 8 of the instruction memory, instructions {e, f, g} are stored, and values {00, 00, 01} fill the compression buffer. Since there is one "01" in the compression buffer, the timer is 0. In the instruction buffer of the instruction preparation unit 400, the instructions of {b, c, d} that were fetched during the previous clock cycle are retained. Accordingly, the selection signals are combined as shown in Table 4, and the instructions to be output becomes an instruction bundle of {d, N, N}. The next program counter becomes 9, and the memory address also is 9 since a new memory access is required.

When the following clock cycle begins, at addresses 6 to 8 of the instruction memory instructions {h, i, j} are stored, and values {00, 01, 01} fill the compression buffer. As there are two "01" in the compression buffer, the timer is 1. The instructions {e, f, g} fetched during the previous clock cycle are loaded in the instruction buffer in the instruction preparation unit 400. The compression codes of {00, 00, 01} fetched during the previous clock cycle also are loaded to the compression buffer in the instruction preparation unit 400. Consequently, the selection signals are prepared as shown in Table 4, and the instruction to be output is an instruction bundle of {e, f, g}. The next program counter is 11 by increasing the previous program counter by 2, and the memory address is 6 as a new memory access is needed. The subsequent proceedings are carried on in the similar manner.

As described above, various aspects eliminate delay of memory latency and implementation of high speed VLIW machine with a low speed, low power, and low-cost Static Random Access Memory (SRAM). Also, a pipeline structure for generating a memory address may be avoided, and thereby processor performance may be enhanced.

Furthermore, since a program counter and memory address access are controlled individually, repeated memory access to the same region is avoided, and thereby memory power consumption may be reduced.

In addition, a pipeline structure created in the course of compression does not need to be added, and thus a hit time is maintained as one clock cycle and degradation of cache performance may be prevented.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating an instruction bundle including a sequence of decompressed instructions configured for processing in parallel by a processor, the method comprising:
   fetching a compressed instruction and a compression code during a clock cycle; and
   generating an instruction bundle from the compressed instruction using a compression code fetched before the clock cycle wherein when one of the fetched instructions is a conditional branch instruction, an instruction bundle configured to be executed when a first condition is satisfied is decompressed using a compression code corresponding to the conditional branch instruction and fetched along with the instruction, and an instruction bundle to be executed when a second condition is satisfied is decompressed using a compression code included in the conditional branch instruction itself.

2. A processor configured to process individual instructions included in an instruction bundle in parallel by using inner processing blocks, the processor comprising:
   a compression buffer configured to buffer a compression code read from a program memory; and
   an instruction decompression unit configured to decompress compressed instructions currently being fetched from the program memory using a compression code previously stored in the compression buffer;
   wherein the instruction decompression unit includes a timer unit configured to determine an output value according to compression codes read out from the compression buffer, an access control unit configured to calculate and output address values of the program memory from which instructions are read and to calculate and output a value of the program counter according to values of compression codes read out from the compression buffer and an output from the timer unit, and an instruction decompression unit configured to generate and output an instruction bundle by decompressing compressed instructions at addresses specified by the address values output from the access control unit using an output of the timer unit and a compression code previously stored in the compression buffer;
   wherein the timer unit includes:
   an initialization unit configured to establish an initial value by combining values of the compression codes read out from the compression buffer;
   a first timer configured to be initialized by an input of the initialization unit and having an inner clock configured to count down; and
   a second timer configured to receive a value of the first timer, synchronize the received value from the first timer with a clock, and store the synchronized value.

* * * * *